United States Patent
Massey et al.

(10) Patent No.: US 6,660,792 B2
(45) Date of Patent: Dec. 9, 2003

(54) PROCESS FOR FAST HEAT-UP POLYESTERS

(75) Inventors: Freddie Lee Massey, Uniontown, OH (US); George Aaron Deisz, Akron, OH (US); Kevin Rollick, Munroe Falls, OH (US); William C. Tung, Tallmadge, OH (US)

(73) Assignee: M & G USA Corporation, Apple Grove, WV (US)

( * ) Notice: Subject to any disclaimer, the term of this patent is extended or adjusted under 35 U.S.C. 154(b) by 0 days.

(21) Appl. No.: 09/736,817

(22) Filed: Dec. 14, 2000

(65) Prior Publication Data

US 2003/0018115 A1 Jan. 23, 2003

Related U.S. Application Data

(60) Provisional application No. 60/172,819, filed on Dec. 21, 1999.

(51) Int. Cl.⁷ .............................. C08J 3/00; C08K 5/49; C08K 3/10; C08L 67/00
(52) U.S. Cl. .................. 524/414; 524/115; 524/435; 524/439
(58) Field of Search ................. 524/414, 435, 524/439, 115

(56) References Cited

U.S. PATENT DOCUMENTS

| | | | |
|---|---|---|---|
| 4,250,078 A | 2/1981 | McFarlane et al. | 260/40 R |
| 4,408,004 A | 10/1983 | Pengilly | 524/398 |
| 4,420,581 A | 12/1983 | McFarlane et al. | 524/431 |
| 4,582,872 A | 4/1986 | Hudgin et al. | 524/439 |
| 5,409,983 A | 4/1995 | Jones et al. | 524/439 |
| 5,419,936 A | 5/1995 | Tindale | 428/35.8 |
| 5,529,744 A | 6/1996 | Tindale | 264/532 |
| 6,022,920 A | 2/2000 | Maxwell et al. | 524/431 |
| 6,034,167 A | 3/2000 | Tung et al. | 524/496 |

FOREIGN PATENT DOCUMENTS

| | | | | |
|---|---|---|---|---|
| EP | 0 465 040 A1 | 6/1991 | | B29C/49/06 |
| GB | 1313293 | * | 4/1973 | |
| WO | WO 99/37708 | 7/1999 | | C08K/3/22 |

* cited by examiner

Primary Examiner—Patrick D. Niland
(74) Attorney, Agent, or Firm—Renner, Kenner, Greive, Bobak, Taylor & Weber

(57) ABSTRACT

A thermoplastic composition, such as PET, contains an inert iron compound such as FeP, FeSi, or combinations thereof, having no chemical activity in the PET, with or without certain quantities of elemental metals, such as antimony, and a reducing agent or other stabilizer such as phosphite or phosphoric acid. A method for forming this composition is also disclosed. The composition may also optionally contain a color stabilizer, a DEG inhibitor and stress crack inhibiting agents.

23 Claims, 1 Drawing Sheet

PROCESS FOR FAST HEAT-UP POLYESTERS

This application claims the benefit of Provisional Application No. 60/172,819, filed Dec. 21, 1999.

FIELD OF THE INVENTION

The field of this invention relates to thermoplastic polymers, especially PET, which are modified to improve their heat-up characteristics while maintaining viable color and low haze.

BACKGROUND OF THE INVENTION

Heretofore, various compositions have been prepared to reduce the heat-up time in preforms before they are blown into containers for food or beverages. This reduction can be affected by adding components to a thermoplastic polymer, like PET, to increase its ability and efficiency to absorb electromagnetic radiation (EMR) during heat-up. These additives, however, cannot have a substantial negative impact on color or haze properties of the resultant PET bottle or container.

One attempt to reduce heat-up time in PET was taught in Pengilly U.S. Pat. No. 4,408,004 by providing a high clarity, low haze polyester containing carbon black. More recently, use of graphite has been found to be a more effective additive than carbon black in this regard.

Certain iron oxides may also accomplish this function. For instance, U.S. Pat. No. 4,420,581 discloses the use of $Fe_2O_3$ (red iron) for this purpose. In International Publication No. WO 99/37708, a disclosure is made that $Fe_3O_4$ may be even more effective than $Fe_2O_3$. Finally, U.S. Pat. Nos. 4,408,004 and 5,419,936 incorporate elemental antimony, produced by the action of a reducing agent on the antimony polymerization catalyst, to reduce heat-up times.

None of these disclosures incorporate a compound, especially an iron alloy, where the iron in the iron compound is inert or chemically unreactive with the polymer or with any other additive to the polymer. Thus, the need continues to exist for such a composition of matter.

SUMMARY OF THE INVENTION

The discovery of this invention comprises a thermoplastic polymer, exemplified by poly(ethylene terephthalate) (PET), having its heat-up rates drastically improved while not substantially adversely affecting its color properties or haze content. By the term "substantially adversely affecting", it is meant that these properties are maintained at or below the desired levels for useful compositions. Generally, this means that, on a preform, L*, a* and B* values should be maintained in a tolerable range wherein preform L* is less than 60, and the a* (red/green value) and b* (blue/yellow value) should be close to neutral (0) or minus values, and not greater than plus 3.0 or plus 7.0, respectively. For production of acceptable preforms and bottles, preform haze values should be kept below 60%, and bottle haze values should be kept below 6%.

Thus, the invention is specifically directed toward PET with an inert iron compound selected from iron phosphide, iron silicide, or combination thereof, in a quantity effective to reduce heat-up time, but not large enough to negatively impact qualities of L*, b*, and a* color properties or haze content. The compositions of this invention may also contain elemental metals, such as antimony, and a reducing agent, to further increase the PET's heat-up rate. If no element metals are used, the composition may still include a non-reducing stabilizer to increase the PET's heat-up rate.

Thus, the present invention generally provides a composition of matter comprising a thermoplastic polymer, an inert iron compound having no chemical reactivity to the thermoplastic polymer, and an elemental metal.

One or more other aspects of the present invention may be found in a composition of matter comprising a thermoplastic polymer, an inert iron compound having no chemical reactivity to the thermoplastic polymer, and a phosphorus stabilizer in either the trivalent or pentavalent state.

Still other possible aspects of the present invention may be provided by a blend of PET with one or more of FeP, $Fe_2P$, $Fe_3P$, and FeSi; an antimony catalyst; and a phosphite or a phosphate.

At least one or more of the advantages of the present invention over the known art relating to thermoplastic polymers, which shall become apparent from the specification as follows, are accomplished by the invention as hereinafter described and claimed.

BRIEF DESCRIPTION OF THE DRAWING

The FIGURE is a graphical representation showing re-heat surface temperatures and temperature differences for Sample Resins F through I.

DESCRIPTION OF THE INVENTION

Figure 1:
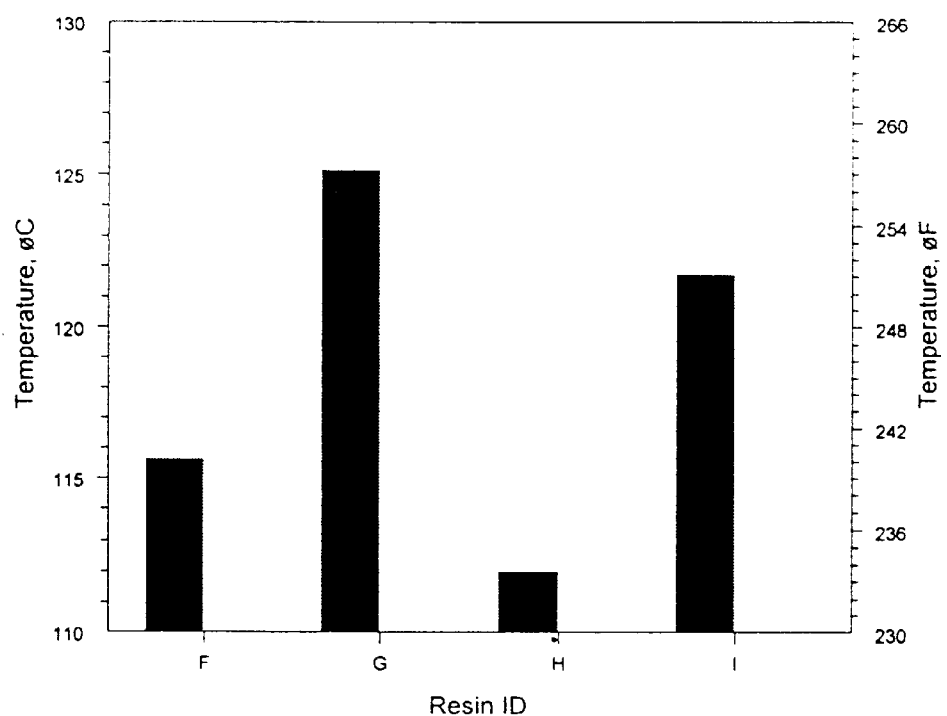

Manufacturers who produce bottles from preforms are constantly seeking process efficiencies. They need to operate their equipment at maximum rates of production to maintain operation efficiencies. This reduces production costs. Therefore, manufacturers continually pressure their resin suppliers to provide resins with faster heat-up rates for use in their IR ovens, used to re-heat preforms for the bottle blow molding operation. The most viable means to accelerate resin heat-up rate is via additives.

Although essentially any thermoplastic polymer can be employed, poly(ethylene terephthalate) (PET) resins and PET copolymer resins are generally used for the production of food containers. Other thermoplastic polymers known to be particularly suitable for food containers and the like are poly(ethylene naphthalate) (PEN) resins or copolymers thereof. Such copolymers of PET and/or PEN can also comprise isophthalic acid (IPA or PIA). This invention relates to compositions of matter comprising thermoplastic polymers, preferably polyester polymers, and more preferably, PET and its copolymers with IPA and/or with PEN. It is preferred that the composition of present invention contain at least about 95% polyester, preferably in the form of PET.

A PET polyester is usually produced via a condensation reaction whereby a dicarboxylic acid, a hydroxyalkyl, or hydroxyalkoxy substituted carboxylic acid, or a combination thereof, having from 2–40 carbon atoms, is reacted with a polyhydric alcohol, such as a glycol or diol containing from 2–20 carbon atoms. The reaction may alternatively be conducted with an ester of the polycarboxylic acid in an transesterification reaction to form the basic melt phase polyester with the off product being ethylene glycols (EG) or other glycols, such as are used to prepare the polymer, and water. The dicarboxylic acids, and/or a hydroxyalkyl, or hydroxyalkoxy substituted carboxylic acids, are usually aryl in nature, containing from 8–16 carbon atoms. The preferred aryl dicarboxylic acid is terephthalic acid (TPA) with the COOH substitution being in the para position. This monomer is also referred to as PTA. Other dicarboxylic acids can also be used, such as an isophthalic acid (IPA or PIA) (or a naphthalene dicarboxylic acid or naphthalene carboxylate) (NDA or NDCA).

The glycol component can be any glycol having from 2 to 8 carbon atoms with the preferable glycol being ethylene glycol or propylene glycol. Glycol ethers having from 4 to 12 carbon atoms may also be used.

The preferred polyester used in this invention is a terephthalate polyester having a relatively high content of IPA up to 5% or more. It is also contemplated that between about 2 and about 10% of a PEN may be added to the polymer chain.

The reaction of the dicarboxylic acid with the glycol can be catalyzed with antimony. The antimony is usually based on antimony trioxide, $Sb_2O_3$ (ATO) or antimony triacetate, $Sb(CH_3CO_2)_3$ (ATA). It is usually used as an ethylene glycol solution. This catalytic compound is contained in the final polymer as a terephthalate and/or glycolate salt (esters). It is also possible to provide a reducing agent such as hypophosphorus acid, or its esters, such as phosphites or phosphonites, to provide a trivalent phosphorus ion ($P^{+3}$) to reduce the $Sb_2O_3$ to elemental antimony, $Sb^0$. The quantity of elemental Sb may vary from about 3 PPM elemental Sb to about 250 PPM elemental Sb depending on the quantity of catalyst added and the degree of reduction of that catalyst using the trivalent phosphorus ion. The active antimony catalyst, trivalent antimony ($Sb^{+3}$), may be present in a quantity of from about 40 to about 400 PPM and the trivalent phosphorus (as hypophosphorus acid, phosphite, or phosphonite), as a reducing agent, may be present in an amount ranging from about 7 to about 160 PPM.

The compositions of this invention may also contain other elemental metals other than antimony, such as copper, silver, or a combination thereof, produced by a reducing agent, to further increase the PET's heat-up rate.

The compositions of matter of the present invention do not necessarily require a reducing agent and a precipitated elemental metal such as antimony, Sb. The inert iron compounds discussed below can also provide a substantial improvement in heat-up performance of polyester resins that do not employ precipitated metallic antimony, $Sb^0$, from the oxidation-reduction reaction between the antimony catalyst and the phosphite stabilizer. These polyester resins are stabilized with non-reducing pentavalent phosphorus ($P^{+5}$) additives such as phosphoric acid and its esters. Preferably, these phosphorus stabilizers can be added in amounts ranging from about 3 PPM to about 120 PPM based on the weight of the PET.

The polyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to minimize or eliminate the yellow color, b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

The color and brightness of a polyester article can be observed visually, and can be quantitatively determined by a HunterLab ColorQUEST® Spectrophotometer, in a reflectance mode, with a 2° observer angle and a D65 illuminant. This instrument uses the 1976 CIE L*, a*, b*, designations of color and brightness determination, such that an a* coordinate defines a color axis wherein plus values are towards the red end of the spectrum and minus values are toward the green end; a b* coordinate, which defines a second color axis, wherein plus values are towards the yellow end of the spectrum and minus values are toward the blue end; and an L* coordinate wherein higher values indicate enhanced brightness of the material.

The color with regard to polyester bottle preforms having a nominal sidewall cross-sectional thickness of about 0.125 inch (3.175 millimeters) is generally indicated by an a* coordinate value ranging from about minus 3.0 to about plus 3.0, more preferably from about minus 2.0 to about plus 2.0, and most preferably from about minus 1.0 to about plus 1.0; and a b* coordinate value ranging from about minus 5.0 to about plus 7.0, more preferably from about minus 4.0 to about plus 4.0, and most preferably from about minus 3.0 to about plus 3.0. . Thus, it is preferred that the bottle preform is essentially neutral or colorless in hue (as measured on a sample having a sidewall cross-sectional thickness of about 0.125 inches).

The brightness of the bottle preforms discussed above is measured on the L* coordinate axis wherein higher values denote greater brightness. L* values for the bottle preforms discussed herein should generally be greater than 65.0, more preferably greater than 70.0, and most preferably greater than 75.0 (as measured on a sample having a sidewall cross-sectional thickness of about 0.125 inches).

FeP, $Fe_2P$, and $Fe_3P$ exemplify the iron phosphides useful in this invention. All of these compounds are alloys including inert iron (i.e., iron which is chemically unreactive with any of the thermoplastic polymers of this invention) by deactivating reaction with phosphorus.

Any iron compounds which are left chemically inert with respect to reactivity with the polymers of this invention are potentially suitable for the present invention. To that end, iron silicides (FeSi) may be used and have been found to be particularly useful in some respects. The most preferred inert iron alloy or compound is a ferrophosphorus combination of FeP, $Fe_2P$ and FeSi available under the tradename Ferro-Phos®. This preferred ferrophosphorus/ferrosilicon composition or mixture may have a typical composition of FeP 18–39%, $Fe_2P$ 49–62% and FeSi 6–18%. This material may be commercially purchased from Occidental Chemical Corporation of Dallas, Tex. The preferred product constitutes a dark gray, odorless power having a specific gravity of 6.53 and bulk density of 19 lbs./gal. This composition may come in different grades with the microfine grade 2132 being the most preferred grade of this composition.

The inert iron compounds, and more preferably, the iron phosphide compositions may be present in sufficient quantities to achieve the preform reheat performance desired of the composition of the present invention. Generally, amounts ranging from about 10 PPM to about 500 PPM, more preferably, from about 25 PPM to about 150 PPM, and most preferably, from about 35 PPM to about 70 PPM, are used.

Thus, it will be appreciated that the composition of matter of the present invention contains a majority of the thermoplastic polymer, which is at least about 95% and more preferably, about 99% PET, or combinations of PET with IPA or PEN.

Also, it will be appreciated that other heat-up additives such as graphite can be added to the composition. Where graphite is used in combination with the iron phosphide, iron silicide or combination thereof, it may be used at levels ranging from about 0.5 to about 3 PPM based on the weight of the PET.

As set forth above, the addition of the inert iron compound to the homopolymer or copolymer of PET substantially improves the bottle production rate by improving the bottle preform reheat performance. This increase in bottle preform reheat is due to the high electromagnetic radiation (EMR) absorbent properties of the particular inert iron additives, which improve the ability of the polyester to absorb the InfraRed (IR) radiation used to reheat the preforms prior to blowing bottles for sale.

The inert iron compound may be placed into the polymer at any time during the polymer's or copolymer's production. It can be added during the esterification phase and/or during the polycondensation phase of the melt polymerization to produce the polyester resin. With proper drying it can be added directly during extrusion processing of polyester resin to make bottle preforms or polyester sheeting. It can also be added during extrusion processing of polyesters to form a masterbatch for subsequent let down addition to extrusion processed polymer, to the desired levels. The inert iron composition is not reactive to the polymer; therefore, it is very process friendly as to how its addition is made to the polymeric composition of matter. It can even be placed into the composition by addition to the esterification dicarboxylic acid or a hydroxyalkyl, or hydroxyalkoxy substituted carboxylic acid/diol admixture used to make the melt polymer, and to molten low molecular weight (0.35–0.65 dl/g IV) polyester prior to pelletizing and solid state polymerization of the pellets to obtain a higher intrinsic viscosity (IV). It can also be added to polyester melt polymerization processes that produce high IV resin not requiring solid state polymerization.

EXAMPLES

Example 1

A copolymer of PET was made having IPA in a quantity of 2.9 mol % with 97.1% terephthalic acid. The polymer was made in a commercial apparatus using antimony oxide catalyst with cobalt acetate as a color stabilizer. The experiments produced Resins A–E to show a comparison of resins with the iron phosphides (FeP) both with and absent additional graphite (KS6) additives. Table I shows monomer composition for each resin.

Table II shows additives and amounts, and L*, a*, b*, and haze values of the preforms from resins A–E. The graphite used is labeled KS6.

TABLE I

RESINS SAMPLES A–E MONOMER COMPOSITION

| Series No. | Remark | Monomer Composition, Mole % | | | |
|---|---|---|---|---|---|
| | | TPA | IPA | EG | DEG |
| A | Control | 97.1 | 2.9 | 97 | 3 |
| B | CP1 | 97.1 | 2.9 | 97 | 3 |
| C | Control + Max KS6 | 97.1 | 2.9 | 97 | 3 |
| D | Control + Max FeP | 97.1 | 2.9 | 97 | 3 |
| E | Max (Sb$^0$ + FeP + KS6) | 97.1 | 2.9 | 97 | 3 |
| B2 (Repeat of B) | CP2 | 97.1 | 2.9 | 97 | 3 |

TABLE II

RESINS A–E: ADDITIVES IMPACT ON PREFORM COLOR AND HAZE

| Series No. | Remark | Composition, PPM | | | | | | Preform (Avg. of 5) | | | |
|---|---|---|---|---|---|---|---|---|---|---|---|
| | | Na | FeP | KS6 | P$^{+3}$ | Sb$^{+3}$ | Co$^{+2}$ | L* | a* | b* | % Haze |
| A | Control | 2 | 0 | 0 | 35 | 240 | 44 | 63.10 | 0.14 | 1.82 | 56.58 |
| B | CP1 | 2 | 70 | 3 | 52.5 | 240 | 44 | 57.18 | −0.07 | 3.89 | 57.10 |
| C | Control + Max FeP | 2 | 0 | 6 | 35 | 240 | 44 | 55.72 | −0.15 | 2.08 | 58.08 |
| D | Control + Max FeP | 2 | 140 | 0 | 35 | 240 | 44 | 55.54 | 0.04 | 2.29 | 57.96 |
| E | Max (Sb$^0$ + FeP + KS6) | 2 | 140 | 6 | 70 | 240 | 44 | 49.03 | −0.08 | 2.28 | 58.95 |
| B2 (Repeat of B) | CP2 | 2 | 70 | 3 | 52.5 | 240 | 44 | 55.90 | 0.06 | 2.20 | 57.78 |

For improved heat-up performance, it is desired to have preform L* less than 60, while always considering that the a* (red/green value) and b* (blue/yellow value) corresponds to the L* values, they should be close to neutral (0) or minus values. For production of acceptable preforms and bottles, preform haze values should be kept below 60%, and bottle haze values should be kept below 6%.

The reheat times for Resins A–E were developed to determine the lowest possible re-heating time for preforms made from the Resins A–E. Table III shows minimum preform re-heat times for acceptable bottles for Resins A–E.

TABLE III

RESINS A–E: MINIMUM PREFORM RE-HEAT TIMES FOR ACCEPTABLE BOTTLES AND PREFORM SURFACE TEMPERATURE

| Series No. | Preform (Avg. of 5) | | | | Minimum Re-Heat Blow Time, Secs. | Preform Surface Temperature ° C. |
|---|---|---|---|---|---|---|
| | L* | a* | b* | % Haze | | |
| A | 63.10 | 0.14 | 1.82 | 56.58 | 40 | 122.04 |
| B | 57.18 | −0.07 | 3.89 | 57.10 | 36 | 121.85 |
| C | 55.72 | −0.15 | 2.08 | 58.08 | 39 | 127.74 |
| D | 55.54 | 0.04 | 2.29 | 57.96 | 37 | 124.44 |
| E | 49.03 | −0.08 | 2.28 | 58.95 | 36 | 128.81 |
| B2 (Repeat of B) | 55.90 | 0.06 | 2.20 | 57.78 | 37 | 125.67 |

The higher preform surface temperatures at shorter re-heat times shows the improved IR heat energy absorption efficiency imparted to the resin by incorporation of the ferrophosphorous/ferrosilicon (FerroPhos®) (FeP) additive with or without graphite (KS6) present.

After the preforms were heated, they were blown into bottles and the color properties and percent haze were calculated for these bottle. The values of the colors and percent haze are shown in Table IV for Resins A–E.

Table V shows monomer and stabilizer composition of polyester resins F–I, while identifying the EMR absorbers present.

TABLE IV

RESINS A–E: BOTTLE COLOR AND HAZE PROPERTIES

| Series No. | Remark | Composition, PPM |  |  |  |  |  | Bottle Color |  |  | % Haze |
|---|---|---|---|---|---|---|---|---|---|---|---|
|  |  | Na | FeP | KS6 | $P^{+3}$ | $Sb^{+3}$ | $Co^{+2}$ | L* | a* | b* |  |
| A | Control | 2 | 0 | 0 | 35 | 240 | 44 | 89.94 | −0.1 | 1.27 | 1.54 |
| B | CP1 | 2 | 70 | 3 | 52.5 | 240 | 44 | 88.7 | −0.1 | 1.36 | 2.68 |
| C | Control + Max KS6 | 2 | 0 | 6 | 35 | 240 | 44 | 88.92 | −0.1 | 1.49 | 2.07 |
| D | Control + Max FeP | 2 | 140 | 0 | 35 | 240 | 44 | 88.59 | −0.1 | 1.45 | 3.18 |
| E | Max ($Sb^0$ + FeP + KS6) | 2 | 140 | 6 | 70 | 240 | 44 | 87.12 | −0.1 | 1.48 | 4.15 |
| B2 Repeat of B) | CP2 | 2 | 70 | 3 | 52.5 | 240 | 44 | 88.29 | −0.1 | 1.40 | 3.05 |

From these results it can be seen that the addition of ferrophosphorus and/or ferrosilicon compounds, with or without the presence of graphite, can significantly reduce preform heat-up time requirements to allow faster bottle production with negatively impacting preform and bottle color and haze values.

Example 2

The resins described in the previous example all used a phosphite stabilizer. Thus, the heat-up performance of the resin is a combined effect of the added iron phosphides/iron silicide content of the ferrophosphorus (FeP) additive and precipitated metallic antimony, $Sb^0$, from the oxidation-reduction (REDOX) reaction between the antimony catalyst and the phosphite stabilizer, a reducing agent.

The iron phosphides/iron silicide can also provide a substantial improvement in heat-up performance of polyester resins that do not employ precipitated metallic antimony, $Sb^0$, from the oxidation-reduction reaction between the antimony catalyst and the phosphite stabilizer. These polyester resins are stabilized with non-reducing pentavalent phosphorus ($P^{+5}$) additives such as phosphoric acid and its esters.

A commercial PET resin having a quantity of 1.8% IPA, and prepared by the reaction of isophthalic acid, terephthalic acid, ethylene glycol, diethylene glycol (created in-situ with or without additional DEG added), antimony oxide catalyst, phosphoric acid stabilizer (i.e., a phosphite), and cobalt acetate tetra-hydrate color toner, was modified with the FerroPhos® ferrophosphorus/ferrosilicon additive.

TABLE V

RESINS F–I: MONOMERS AND ADDITIVES

| Resin ID | Composition, Mole % |  |  |  | Stablizer Type in PPM |  | EMR Absorber |  |
|---|---|---|---|---|---|---|---|---|
|  | TPA | IPA | EG | DEG | $P^{+3}$ | $P^{+5}$ | $Sb^0$ | FeP |
| F | 98.2 | 1.8 | 97 | 3 | 30 |  | X |  |
| G | 98.2 | 1.8 | 97 | 3 | 40 |  | X |  |
| H | 100 | 0 | 96 | 4 |  | 40 |  |  |
| I | 100 | 0 | 96 | 4 |  | 40 |  | X |

EMR = Electromagnetic Radiation, i.e., InfraRed (IR) radiation
FeP = Ferrophosphorus compound (can contain FeP, $Fe_2P$, $Fe_3P$, FeSi)

Resins F through H are commercially produced resins, and Resin I is Resin H containing the experimental ferrophosphorus additive. Resins F and G are phosphite stabilized compositions. Resin G is a faster heat-up version of Resin F, accomplished by increased REDOX precipitated $Sb^0$ level by use of increased phosphite content. Resin H is a phosphoric acid stabilized composition, and Resin I is resin H with 120 PPM FerroPhos® ferrophosphorous/ferrosilicon added.

Table VI shows the preform color and haze values for resins F through I.

Table VII below shows average bottle data for Resins F through I, including the amount of FerroPhos® ferrophosphous/ferrosilicon additive in Resin I with applicable aesthetic color values for L*, a*, b*, and % haze.

Table VIII shows the average preform temperature for each of the Resins F through I.

TABLE VI

RESINS F–I: PREFORM COLOR AND HAZE

| Sample | Additive Composition, PPM |  |  |  |  |  | L* |  | a* |  | b* |  | % Haze |  |
|---|---|---|---|---|---|---|---|---|---|---|---|---|---|---|
|  | Na | $P^{+3}$ | $P^{+5}$ | $Sb^{+3}$ | $Co^{+2}$ | FeP | Avg. | SD | Avg. | SD | Avg. | SD | Avg. | SD |
| F | 2 | 30 | 0 | 236 | 21 | 0 | 68.02 | 1.96 | 0.21 | 0.49 | 4.2 | 0.67 | 67.9 | 3.19 |
| G | 2 | 40 | 0 | 250 | 40 | 0 | 56.96 | 2.29 | −0.23 | 0.06 | 3.32 | 0.36 | 67.9 | 3.13 |
| H | 0 | 0 | 40 | 210 | 40 | 0 | 71.43 | 2.87 | 0.37 | 0.16 | 3.88 | 1.74 | 64.9 | 2.49 |
| I | 0 | 0 | 40 | 210 | 40 | 120 | 55.69 | 1.00 | 0.25 | 0.10 | 5.67 | 0.73 | 63.5 | 3.19 |

TABLE VII

RESINS F–I: BOTTLE COLOR AND HAZE

| | Additive Composition, PPM | | | | | | L* | | a* | | b* | | % Haze | |
|---|---|---|---|---|---|---|---|---|---|---|---|---|---|---|
| Sample | Na | $P^{+3}$ | $P^{+5}$ | $Sb^{+3}$ | $Co^{+2}$ | $FeP^2$ | Avg. | SD | Avg. | SD | Avg. | SD | Avg. | SD |
| F | 2 | 30 | 0 | 236 | 21 | 0 | 90.12 | 0.11 | −0.10 | 0.01 | 1.62 | 0.07 | 3.23 | 0.31 |
| G | 2 | 40 | 0 | 250 | 40 | 0 | 87.13 | 0.59 | −0.16 | 0.02 | 2.88 | 0.33 | 4.95 | 0.88 |
| H | 0 | 0 | 40 | 210 | 40 | 0 | 90.58 | 0.25 | −0.05 | 0.03 | 1.55 | 0.26 | 3.87 | 1.11 |
| I | 0 | 0 | 40 | 210 | 40 | 120 | 89.16 | 0.10 | −0.08 | 0.01 | 1.63 | 0.08 | 5.59 | 0.64 |

TABLE VIII

RESINS F–I: PREFORM SURFACE TEMPERATURE INCREASE

| | Additive Composition, PPM | | | | | | Preform Surface Temperature, °C. | | | |
|---|---|---|---|---|---|---|---|---|---|---|
| Sample | Na | $P^{+3}$ | $P^{+5}$ | $Sb^{+3}$ | $Co^{+2}$ | $FeP^2$ | Avg. | Delta | SD | % CV |
| F | 2 | 30 | 0 | 236 | 21 | 0 | 240.12 | — | 1.35 | 0.56 |
| G | 2 | 40 | 0 | 250 | 40 | 0 | 257.26 | 17.14 | 0.46 | 0.18 |
| H | 0 | 0 | 40 | 210 | 40 | 0 | 233.56 | — | 0.59 | 0.25 |
| I | 0 | 0 | 40 | 210 | 40 | 120 | 251.08 | 17.52 | 0.64 | 0.25 |

In Table VIII, without the aid of REDOX precipitated metallic antimony, $Sb^0$, phosphoric acid stabilized Resin I (Resin H with 120 PPM FerroPhos®) achieved equivalent heat absorption performance to that of a commercial high heat-up rate product, Resin G. This is shown by an equal temperature increase over the non-FerroPhos® containing Resin H, as obtained for Resin G over Resin F by the addition of more trivalent phosphorus stabilizer to precipitate additional $Sb^0$ for improved hear-up performance.

FIG. 1 shows in graphic form preform re-heat surface temperatures and temperature differences for Resins F through I of this example. These temperatures are those measured at the preform surface by an IR scanning temperature sensor just prior to bottle mold closure at the time of bottle blow molding. The resulting increase in preform surface temperature at mold closure for Resin I, (i.e., Resin H with 120 PPM FerroPhos®), implies faster heat-up rates and faster processing potential.

Addition of ferrophosphorus/ferrosilicon compounds to naphthalate containing or naphthalate-based polyesters results in likewise improved heat-up efficiencies.

The L* drop and comparable b* values for ferrophosphorus/ferrosilicon modified PET resin-based containers, film, or sheeting, is acceptable from an aesthetic point of view. It is believed that the % haze increase at 120 PPM is not destructive to the commerciality of the resin, and products made from it.

Thus, it should be evident that the composition of the present invention is highly effective in improving the heat-up characteristics of various thermoplastic polymers. The invention is particularly suited for PET, but is not necessarily limited thereto. The composition of the present invention can be used with known equipment, methods and the like, for the manufacture of, among other things, preforms for bottles.

Based upon the foregoing disclosure, it should now be apparent that the use of the composition described herein will carry out the objects and advantages set forth hereinabove. It is, therefore, to be understood that any variations evident fall within the scope of the claimed invention and thus, the selection of specific component elements can be determined without departing from the spirit of the invention herein disclosed and described. In particular, thermoplastic polymers according to the present invention are not necessarily limited to PET. Moreover, as noted hereinabove, other elemental metals can be substituted for the antimony preferably employed. Thus, the scope of the invention shall include all modifications and variations that may fall within the scope of the attached claims.

What is claimed is:

1. A composition of matter comprising at least 95 percent of a thermoplastic polymer, and from about 10 PPM to about 500 PPM, based on the weight of the polymer, of an inert iron compound having no chemical reactivity to the thermoplastic polymer selected from the group consisting of iron phosphides, iron silicides, or combinations thereof.

2. The composition of claim 1 further comprising a reducing stabilizer for reducing a portion of an active catalyst to elemental metal, or a non-reducing stabilizer.

3. The composition of claim 2 wherein the reducing stabilizer is selected from the group consisting of phosphorus compounds where the phosphorus is in the +3 valence state, and the non-reducing stabilizer is selected from the group consisting of phosphorus compounds where the phosphorus is in the +5 valence state.

4. The composition of claim 1 further comprising an elemental metal selected from the group consisting of antimony, copper, and silver.

5. The composition of claim 1 wherein the inert iron compound comprises at least one of FeP, $Fe_2P$, $Fe_3P$, and FeSi.

6. The composition of claim 1 wherein the iron phosphide, iron silicide or combination thereof, is present separately or in a combination in an amount of from about 15 PPM to 200 PPM based on the weight of the polymer.

7. The composition of claim 1 wherein the composition further comprises an active antimony catalyst in a concentration of from about 40 PPM to 400 PPM based on the weight of the polymer.

8. The composition of claim 1 wherein the thermoplastic polymer is selected from the group consisting of polyethylene terephthalate (PET) resins and PET compolymer resins.

9. The composition of claim 8 wherein the PET resins or PET copolymer resins are formed by the polymerization reaction of an aromatic dicarboxylic acid or a hydroxyalkyl, or hydroxyalkoxy substituted carboxylic acid, or their esters, with at least one glycol.

10. The composition of claim 1 further comprising at least one of a color stabilizer or dye, a DEG inhibitor, and a stress crack inhibitor.

11. A composition of matter comprising at least 95 percent by weight of a thermoplastic polymer, an inert iron compound having no chemical reactivity with the thermoplastic polymer selected from the group consisting of iron phosphides, iron silicides, or combinations thereof, and a phosphorus stabilizer in either the trivalent or pentavalent state.

12. The composition of matter of claim 11 wherein the composition includes the phosphorus stabilizer in the trivalent state and wherein the composition further includes an elemental metal.

13. The composition of matter of claim 12 wherein the thermoplastic polymer is selected from the group consisting of polyethylene terephthalate (PET) resins and PET copolymer resins.

14. The composition of matter of claim 11 wherein the thermoplastic polymer is selected from the group consisting of polyethylene terephthalate (PET) resins and PET copolymer resins, and wherein the stabilizer is a pentavalent phosphorus stabilizer.

15. The composition of claim 13 wherein the iron phosphide, iron silicide or combination thereof, is present in an amount of from about 10 PPM to about 500 PPM based upon the weight of the PET, wherein the elemental metal is present in an amount of from about 3 PPM to about 250 PPM, based on the weight of the PET, wherein the trivalent phosphorus stabilizer is present in an amount of from about 7 PPM to about 160 PPM based upon the weight of the PET, and wherein graphite can be used in combination with the iron phosphide, iron silicide or combination thereof, in levels ranging from about 0.5 to about 3 PPM based upon the weight of the PET.

16. The composition of claim 14 wherein the iron phosphide, iron silicide or combination thereof, is present in an amount of from about 10 PPM to about 500 PPM based upon the weight of the PET, wherein the pentavalent phosphorus stabilizer is present in an amount of from about 3 PPM to about 120 PPM based on the weight of the PET, and wherein graphite can be used in combination with the iron phosphide, iron silicide or combination thereof, in levels ranging from about 0.5 to about 3 PPM based on the weight of the PET.

17. The composition of claim 11 further comprising at least one of a color stabilizer or dye, a DEG inhibitor, and a stress crack inhibiting agent.

18. The composition of claim 17 wherein the color stabilizer comprises cobalt acetate, the DEG inhibitor comprises sodium acetate and the stress crack inhibiting agent comprises aromatic monomers.

19. A blend of polyethylene terephthalate with one or more of FeP, $Fe_2P$, $Fe_3P$, and FeSi; an antimony catalyst; and a phosphite or a phosphate.

20. The blend of claim 19 further containing a color stabilizer and a DEG inhibitor.

21. A preform, capable of being formed into a container, prepared from a composition of matter comprising:
　at least 95 percent by weight of a thermoplastic polymer; and
　from about 10 PPM to about 500 PPM of an inert iron compound having no chemical reactivity to the thermoplastic polymer selected from the group consisting of iron phosphides, iron silicides and combinations thereof;
　wherein the preform has a faster heat up time than the heat up time for a preform made from composition of the same thermoplastic polymer but not including the inert iron compound having no chemical reactivity to the thermoplastic polymer.

22. The preform of claim 21, wherein the inert iron compound does not substantially adversely affect the color properties or the haze content of the preform.

23. The preform of claim 21 further comprising at least one of an elemental metal and a phosphorus stabilizer in either the trivalent or pentavalent state.

* * * * *